Feb. 28, 1967　　　　M. H. DAVIS　　　　3,306,132
DRIVE UNIT
Filed June 1, 1964　　　　　　　　　　3 Sheets-Sheet 1

INVENTOR.
MARION H. DAVIS
BY
Lockwood, Woodard, Smith & Weikart
Attorneys

INVENTOR.
MARION H. DAVIS

INVENTOR.
MARION H. DAVIS

United States Patent Office 3,306,132
Patented Feb. 28, 1967

3,306,132
DRIVE UNIT
Marion H. Davis, Hagerstown, Ind., assignor to V-Plex Clutch Corp., Hagerstown, Ind., a corporation of Delaware
Filed June 1, 1964, Ser. No. 371,699
14 Claims. (Cl. 74—721)

This invention relates generally to vehicle power transmission and more particularly to a drive unit of simple construction incorporating the features of variable speed drive in forward and reverse directions, together with differential action.

There are many different types of vehicle power transmission devices known to those working in the art. For all types of vehicles, there is an continuous effort to obtain better drive units. This is true not only for large and powerful vehicles, but also for small vehicles of comparatively low power. In the latter type of vehicles which may include go-carts, golf carts, and garden tractors, for example, there is a constant need for simpler, more reliable, and better performing variable speed drive units.

It is, therefore, a general object of the present invention to provide an improved variable speed drive unit useful in vehicles and in other applications.

A further object is to provide a drive unit having a neutral condition regardless of the speed of the power source.

A further object is to provide a drive unit which can produce forward or reverse output operation regardless of input power source speed.

A further object is to provide a drive unit which can provide forward and reverse output operation on a single output shaft, if desired.

A still further object is to provide variable output shaft speeds with a constant input shaft speed.

A still further object is to be able to drive one output shaft in a forward direction and another output shaft in a reverse direction at the same time.

A still further object is to provide a drive unit useful with either a vertical or horizontal input shaft.

A further object is to provide a drive unit achieving the foregoing objects and which is quiet and durable in operation and easily operated.

Described briefly, a type embodiment of the present invention includes a first frame to be secured to a vehicle, for example, and having a powered shaft mounted thereon for rotation. First and second conical driver members are secured to the powered shaft in spaced relationship to each other and with their conical surfaces facing away from each other.

Secind and third frames are mounted to the first frame by torsion bars and each of these frames has a driven member mounted for rotation thereon. Each of the driven members has an internal conical surface in closely spaced relationship to portions of the conical friction surfaces of both of the driver members.

A control lever is provided for simultaneously engaging one of the driven members with one of the driver members and the other driven member with the other driver member so as to simultaneously provide outputs from both of the driven members at the same time in the same direction. The lever is movable to both sides of a neutral condition to cause forward or reverse driving of the driven members, as desired. The mounting of the second and third frames to the first frame is such that the contact between the driven members and the driving members can be varied continuously to vary the ratio between the output and input speeds.

The full nature of the invention will be understood from the accompanying drawings and the following description and claims.

Figure 1:
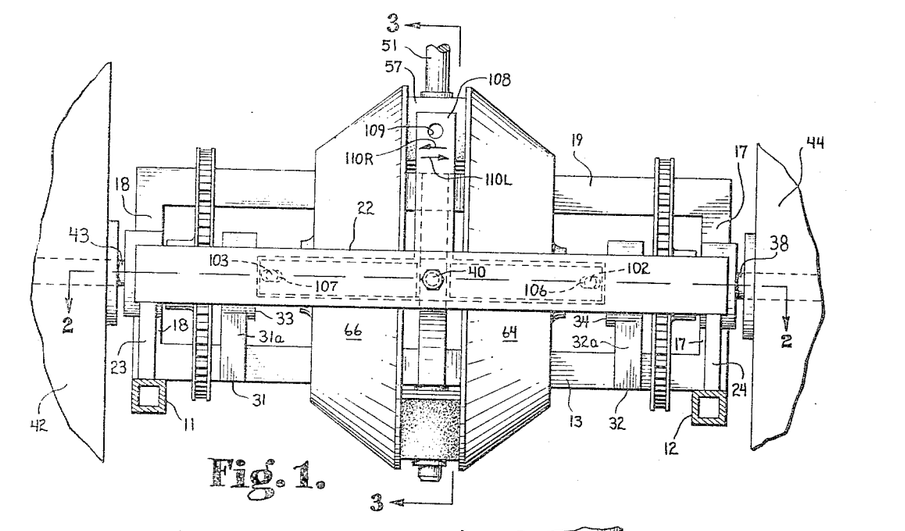
FIG. 1 is a front elevational view of the drive unit of the present invention as mounted to the frame of a vehicle such as a garden tractor, for example, with the tractor frame and wheels being shown fragmentarily.
Figure 2:
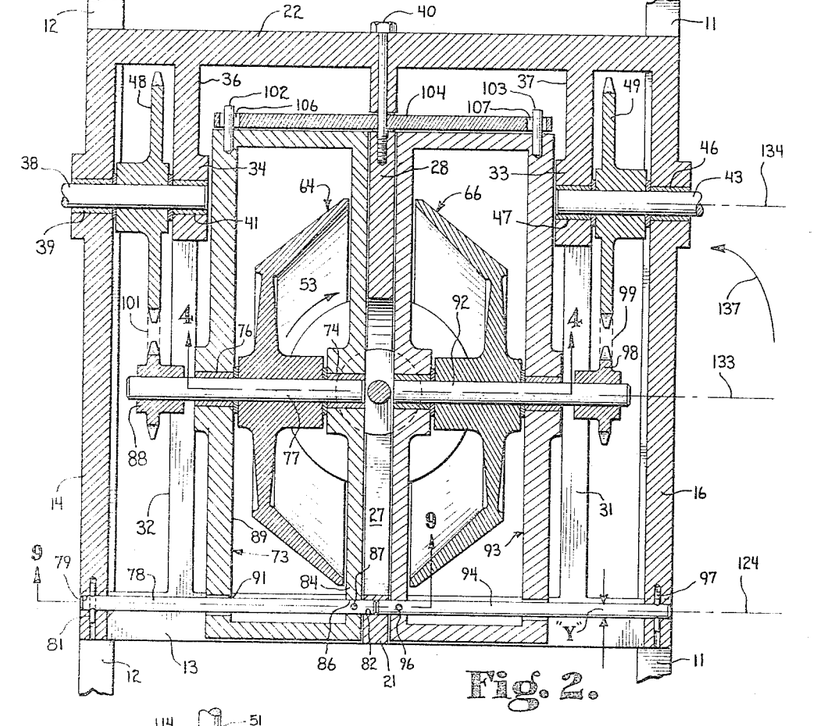
FIG. 2 is a horizontal section thereof taken along line 2—2 of FIG. 1 and viewed in the direction of the arrows.
Figures 3, 10:
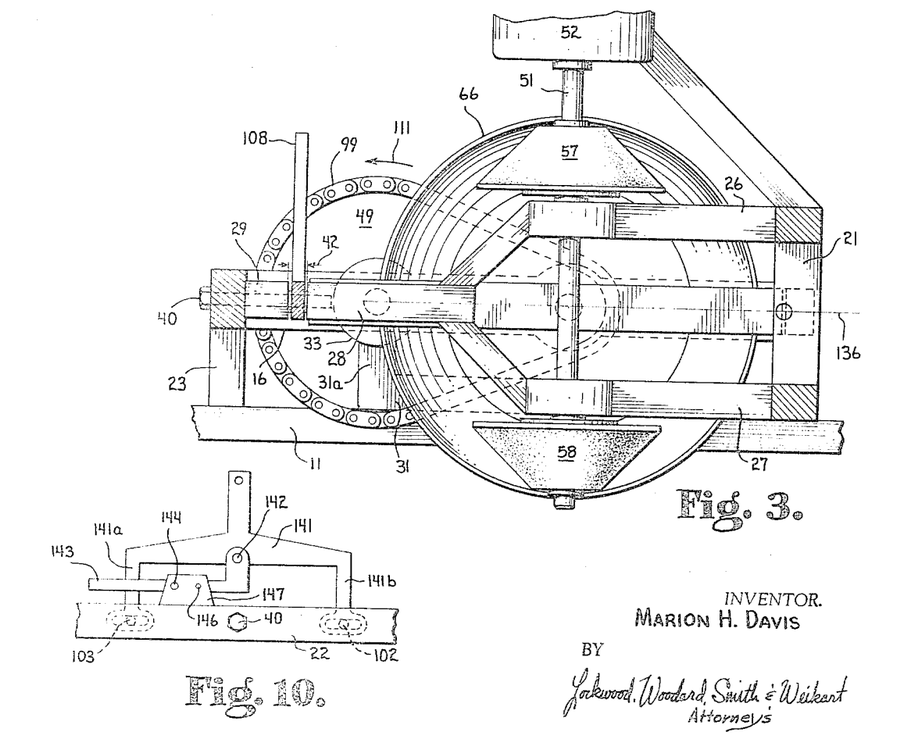
FIG. 3 is an elevation in section taken along the line 3—3 in FIG. 1 and viewed in the direction of the arrows.
FIG. 10 is a fragmentary front elevational view of an embodiment showing means for obtaining simultaneous operation of two output shafts in opposite directions.

Referring now to the drawings in detail, representing a typical embodiment of the present invention, a base frame is provided for mounting the unit to the vehicle frame, and in FIGS. 1, 2, and 3, the members 11 and 12 represent tractor frame side members. For convenience, the base frame is illustrated and described herein as a solid casting. However, it can be made of many types of materials, and by various means of fabrication of parts. The same is true of other frames and members to be described herein.

The illustrated base frame includes a lower rear cross member 13 secured to the top of the tractor frame side members by any suitable means such as bolts and nuts, for example. The base frame also includes side members 14 and 16 joining upstanding posts 17 and 18 (FIGURE 1) which extend upwardly from the cross member 13 at the rear of the base frame. An upper rear cross member 19 of the base frame extends across the upper ends of the posts 17 and 18. An upstanding rear center post 21 (FIGURE 3) extends between the lower and upper rear cross members 13 and 19, respectively, and is equidistant from the side members 14 and 16.

The base frame also includes a front cross member 22 extending between the front ends of the side members 14 and 16. Front support posts 23 and 24 may be connected between the front cross member and the tractor frame side members 11 and 12.

Upper and lower bearing support members 26 and 27 (FIGURE 3), respectively, extend forwardly from the upper and lower rear cross members 19 and 13, respectively, and the front end portions thereof converge and join the member 28. A member 29 extending rearwardly from the front cross member 22 is aligned with the member 28 and a bolt 40 bridges the gap 42 between the ends of the members 28 and 29. All of the base frame members described to this point provide an integral rigid structural unit.

The base frame also includes a pair of intermediate lower side members 31 and 32 (FIGURE 1) extending forwardly from the lower rear cross member 13 and upwardly at 31a and 32a, respectively. Enlargements 33 and 34 are provided at the upper ends of the upwardly extending portions 31a and 32a to accommodate axle inner support bearings. Members 36 and 37 (FIGURE 2) extend forwardly from these bearing enlargements and are connected to the front cross member 22.

As shown in FIG. 2, an axle shaft 38 is supported in bearings 39 and 41 secured in the side member 14 and the enlargement 34, respectively. One of the tractor driving wheels 44 (FIG. 1) is secured to this shaft 38. The axle shaft 43 for the other tractor wheel 42 is received in the bearings 46 and 47 provided in the side members 16 and the enlargement 33, respectively. In order to drive shaft 38, a driven sprocket 48 is secured to the shaft 38 by any suitable means such as a key or set screw, for example. Similarly, a sprocket 49 is provided to drive the shaft 43.

A power input shaft 51 is supported for rotation in the base frame by upper and lower support bearings mounted in the upper and lower bearing support members 26 and 27. This input shaft may be directly connected to a suitable power source such as an engine 52 which may be secured directly to the base frame or to the tractor frame. The direction of rotation of the shaft is constant in the direction of the arrow 53 in FIG. 2.

Figure 4:
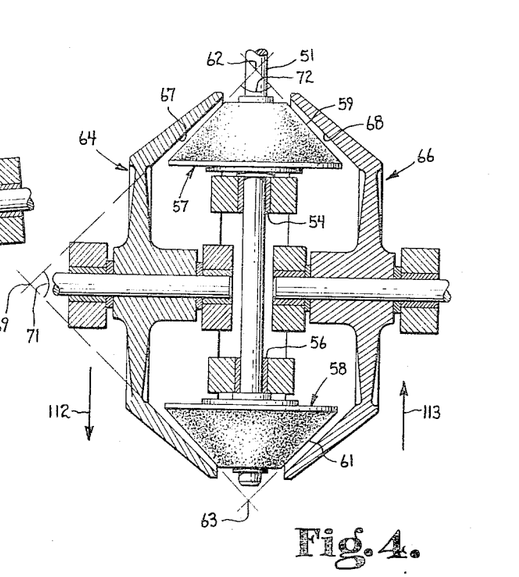
FIG. 4 is a fragmentary section taken along the line 4—4 in FIG. 2 and viewed in the direction of the arrows, and showing the drive unit in neutral.

The input shaft 51 is supported to prevent axial movement thereof with respect to the base frame. Therefore, it can only move in rotation in the upper and lower support bearings 54 and 56. First and second identical drive members 57 and 58, respectively, are secured to the input shaft 51 and, and in the illustrated embodiment, the drive member 57 has a conical friction surface 59 thereon and the drive member 58 has a conical friction surface 61 thereon, these surfaces facing away from each other and in opposite directions. In other words, the conical surfaces are disposed so that the apex 62 of surface 59 (FIGURE 4) and apex 63 of surface 61 are outboard of the drive members.

The members to be driven by these conical drivers are the first and second driven members 64 and 66, each of which in the illustrated embodiment has a conical inner surface facing the driver surfaces. For example, the drum 64 has the inner conical surface 67 (FIGURE 5) facing a portion of each of the surfaces 59 and 61 of the drivers 57 and 58, respectively. Similarly, the drum 66 has the conical surface 68 facing portions of the surfaces 59 and 61. When the drive unit is in neutral condition, there is no contact between the surfaces of the drivers and the driven drums. However, they are in closely spaced relationship. It will be observed that the apex 69 (FIGURE 4) of the surface 67 and the apex of the surface 68 are outboard of the drums. The apex angle 71 of the surface 67 is approximately 2° less than the apex angle 72 of the surface 59. The same is true of surface 68. Therefore, there is an angle of convergence between the surfaces 67 and 68 and the surface 59 of approximately 1°. This is given by way of example only for a purpose which will become apparent as the description proceeds. Normally, the materials used for the surfaces 59 and 61 are durable composition friction materials of the general category which is used in dry disk clutches and brake linings. The materials ordinarily used in the drums 64 and 66 are cast iron. Other combinations of materials may be found equally suitable.

The arrangement of the driving and driven surfaces such that the surfaces are inboard of the apices thereof is one novel feature of the arrangement of the present invention. Another novel feature will be found in the means of supporting and moving the driven drums. For this purpose, and referring to drum 64 specifically, frame 73 (FIGURE 2) is provided with inboard and outboard bearings 74 and 76, respectively, which support the first output shaft 77, to which the drum 64 is secured. Frame 73 is suported in cantilever fashion by a torsion bar 78 as described below.

The outer end portion of the torsion bar 78 is received in a aperture 79 in the outer side member 14 of the base frame. It is pinned to the base frame by the pin 81 which prevents rotation of the bar outer end in the base frame. The inner end portion of the bar 78 is journaled in an aperture 82 in the center post 21 of the base frame. This end of the bar can, therefore, rotate to some extent, under torsional stress, with respect to the outer end of the bar, and when so stressed, a restoring torsional force is created in the bar.

The frame 73 which carries the shaft 77 has an inner side member 84 with an aperture 86 therein which snugly receives the inner end portion of the bar 78. This frame member is pinned to the bar by the pin 87. Because of this arrangement, the weight of the frame 73 and the shaft 77 and the drum 64 as well as the drive sprocket 88 mounted to the outer end of the shaft 77 is supported in cantilever fashion by the torsion bar 78 and is so supported that there is equal clearance between the surface 67 of the drum 64 and the surfaces 59 and 61 of the driver disks. The outer side member 89 of the frame 73 has a large aperture 91 therein through which the torsion bar 78 passes with substantial clearance so that no support for the frame 73 is provided at this point.

For the drum 66 secured to the shaft 92, a frame 93 is provided and is pinned to the torsion bar 94 by the pin 96, the outer end of the torsion bar 94 being pinned to the base frame side member 16 by means of the pin 97. Torsion bar 94 thereby supports the driven member 66 in the same way and at the same spacing from the drivers as the torsion bar 78 supports the driven member 64.

Shaft 92 has a drive sprocket 98 at the outer end thereof which is connected by the chain 99 to the sprocket 49. The drive sprocket 88 at the end of the shaft 77 is connected by the chain 101 to the sprocket 48.

Figures 5, 9:
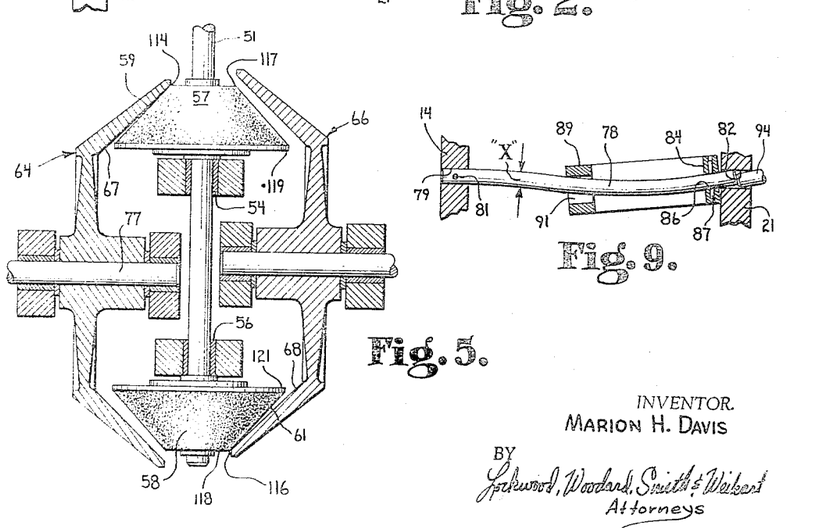
FIG. 5 is a view taken at the same place as FIG. 4 and showing the drive unit in a condition for low ratio of output speed to input speed.
FIG. 9 is a fragmentary section taken along line 9—9 in FIG. 2 and viewed in the direction of the arrows.

At the front end of the frame 73, a pin 102 projects forwardly. Similarly, a pin 103 projects forwardly from the front end of the frame 93. A lever bar 104 (FIGURE 2) is pivotally mounted to the bolt 40 and has an elongated slot 106 receiving the pin 102 and an elongated slot 107 receiving the pin 103. An upstanding arm 108 (FIGURE 1) is connected to the lever 104 and has an aperture 109 therein for connection to a control linkage, if desired. By rocking the arm to either side of center as indicated by the arrows 110R and 110L, FIG. 1, the tractor can be made to go forward or reverse and at different speeds as described below. To drive the tractor forward, it is necessary for the sprocket 49 to be driven in the direction of the arrow 111 in FIG. 3. Sprocket 48 should also be driven in the same direction. It follows that the drums 64 and 66 must also be driven in the same direction. With the input shaft rotating clockwise as viewed from above in FIG. 2, forward rotation of the drum 64 can be obtained if the drum is moved down from the neutral condition shown in FIG. 4 in the direction of the arrow 112. For the drum 66 to be driven in the forward direction, it is necessary to move it from the neutral condition shown in FIG. 4 upwardly in the direction of the arrow 113. This movement will bring these drums into contact with the drivers as shown in FIG. 5. Because of the difference in the apex angles of the conical surfaces, contact is made between the surface 59 and surface 67 which is theoretically a point contact at 114. Similarly, point contact at 116 is obtained between the surface 61 and surface 68. To obtain the upward and downward shifting of the drums 66 and 64, required, to obtain this contact, the arm 108 is pushed in the direction of the arrow 110L (FIGURE 1) thereby pivoting bar 104 clockwise, as viewed in FIGURE 1, displacing drum 66 upwardly and drum 64 downwardly.

Because, as will be evident from FIGURE 5, the contact between the drivers and the driven members is at a minimum radius on the drivers and a maximum radius on the driven members, the drive unit is operating at a low ratio of output speed to input speed. This is the condition under which maximum torque can be transmitted to the wheels. Naturally, in actual operation, there is some flattening of the friction material at or about the theoretical point of contact and this provides the necessary area to accomplish torque transmission and yet the length of the contact area measured from the outer ends 117 and 118 of the driver surfaces toward the inner ends 119 and 121 of the driver surfaces is not sufficient to cause a deterimental scrubbing action between the driver surfaces and the driven surfaces. Therefore, no excesive heat generation occurs.

When an increase of output shaft speed is desired, it is necessary only to push the arm 108 harder to the left in the direction of the arrow 110L. This moves the drums to the position shown in FIG. 6. Under these circumstances, the contact points between the drivers and the drums have moved to the circle of maximum radius on the drivers and to a smaller radius on the driven drums. For example, the drive contact between the surface 59 and surface 67 now occurs at the point 122. Likewise, the drive point between the surfaces 61 and 68 occurs at the point 123. It is in this condition that the maximum ratio of output speed to input speed is obtained.

Precisely the same kind of action can be obtained for driving the tractor in reverse by merely pushing the arm 108 in the direction of the arrow 110R of FIGURE 1. When the arm 108 is released, the drums return to the neutral condition shown in FIG. 4, wherein no torque is transferred between the drivers and the drums. It is the restoring forces created in the torsion bars as they are twisted by movement of the lever 104 that returns the frames and the drums therewith to the neutral condition when the external force is removed from the arm 108.

It is believed readily apparent how the upward and downward movement of the drums is obtained by pivoting the frames on the normal axis 124 (FIGURE 2) of the torsion bars, this being done by moving the arm 108 to rock the lever 104. The frames 73 and 93 can actually be considered as rockable cradles supporting the driven drums and which are rocked on the axis 124 by rocking the lever 104.

Figure 6:
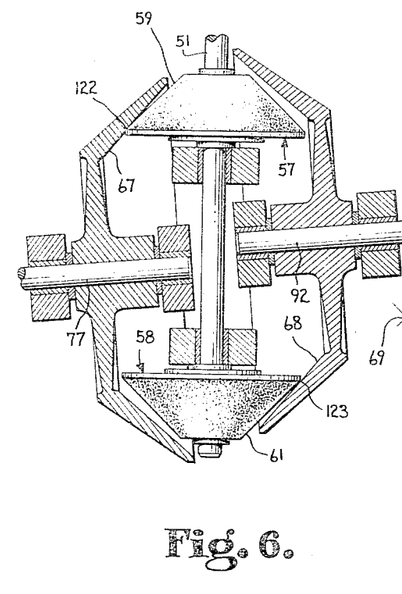
FIG. 6 is a view taken at the same place as FIGS. 4 and 5 but showing the unit in a condition for high ratio of output speed to input speed.

However, it can be observed upon reference to FIG. 6 that in order to move the contact point from the minimum to the maximum circles of the driver surfaces, it is necessary not only to rock the cradles about an axis lying in a horizontal plane perpendicular to the input shaft axis and equidistant between the drivers, but it is also necessary to tilt the drum axes in a plane containing the input shaft axis. This is accommodated by having the aperture 91 in the frame 73 of ample size to allow considerable action of the frame 73 with respect to the torsion bar 78 at this point. This allows the torsion bar 78 to not only twist but also to bend in the configuration shown in exaggerated form in FIG. 9. This permits the axis or shaft 77 to tilt in the plane of the input shaft axis to a degree sufficient to permit the movement of the contact point. The amount of this tilting is exaggerated in FIGS. 6 and 9 to illustrate the action. The torsion bar 78 can be shaped to provide practically any desired amount of bending in a plane parallel to the output shaft axes and the input shaft axes and yet minimize bending in a plane perpendicular thereto. In other words, by minimizing the dimension X (FIG. 9) throughout a portion of the length of the torsion bar 78, and maximizing the dimension Y (FIG. 2), the desired amount of bending in a vertical plane can be obtained consistent with elimination of bending in a horizontal plane and yet obtain the torsional restoration force required to keep the driven drums in neutral at all times that there is no application of external force to the arm 108. The torsion bars will maintain the neutral condition even through the tractor may be coasting over rough terrain in neutral. Because the frames 73 and 93 are pinned to the lever 104, these frames are prevented from accidentially moving in the same direction such as might otherwise occur if the tractor backed off a curb. If they did move in the same direction and both drums simultaneosuly engaged one of the drivers, for example, the right wheel would be driven in one direction and the left wheel in the other direction. It would be undesirable to have this occur as the result of a vertical jolt on the tractor, and the illustrated construction prevents such an event. It will be recognized, however, that if it were desired to use the drive unit of the present invention in an application where one wheel is rotated in one direction and the other is rotated in the other direction, means could readily be incorporated for simultaneously moving both of the cradles in the same direction to obtain that result, as described hereinafter.

Figure 7:
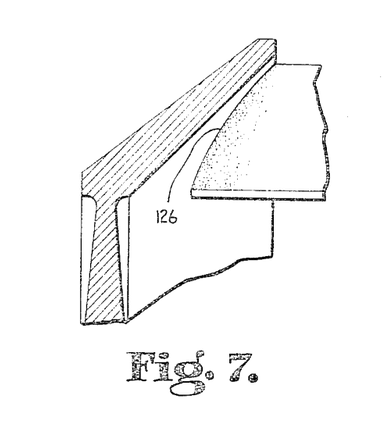
FIG. 7 is an enlarged fragmentary view showing the preferred contour of the drive friction members.
Figure 8:
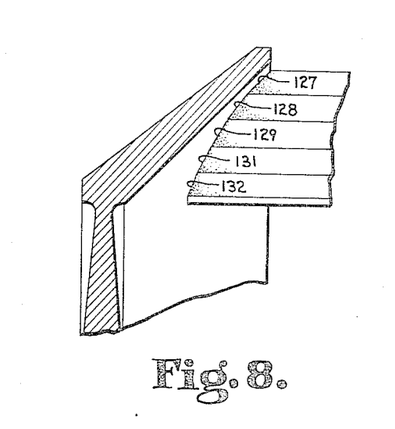
FIG. 8 is an enlarged fragmentary view showing another possible configuration of the friction surface of the drive member.

Referring now to FIGS. 7 and 8, there is shown in FIG. 7 a convex drive surface 126 on the driver which is actually preferable to the straight conical surface shown for simplicity in the preceding illustrations. By having a surface of this nature which is generally convergent toward an apex on the shaft axis outboard of the drive members, the theoretical point contact can be obtained at any point along the surface depending on the amount of force applied to the lever arm 108 to thereby obtain an infinite variation of speed ratios from the maximum to the minimum without any detrimental scrubbing action.

FIG. 8 represents another possible configuration of the outer surface of the drive member wherein it is composed of a plurality of conical segments 127, 128, 129, 131, and 132. This may be found desirable to give a more incremental and stepped-type speed ratio change from minimum to maximum. Other configurations of the driver surface and possibly also the driven drum surface may be found useful.

The present invention also provides a differential action useful to permit a speed difference between the inner and outer wheels as the vehicle is moving in a circular fashion. Normally, when the drive unit is in neutral, the rotational axes 124, 133, and 134 of the torsion bars, output shafts, and axles, respectively, are in a common horizontal plane 136 (FIG. 3). When the drive unit clutching surfaces 59, 67, 61, and 68 are engaged for driving the vehicle forward, the axis of the shaft 92 has moved up out of the plane 136 and that of the shaft 77 has moved down out of the plane 136. This was, of course necessary, to obtain the driving engagement. Normally, this will increase the tension in both of the chains to some extent, because the output shaft axes are pivoting with respect to the torsion bar axis, which is on the side of the output shaft axes opposite to the side on which the axles are located. Assuming now that the tractor is turning to the left which is in the direction indicated by the arrow 137 in FIG. 2, the left wheel speed should decrease with respect to the right wheel speed. This means that the amount of tension in the chain 101 connected to the left wheel shaft will increase compared to the tension in the chain 99 driving the right wheel axle. Because of the normal location of the three axes in the plane 136, the normal tendency of the tension in the drive chains is to return the driven drums to neutral. During the left-hand turn, the pull on the left wheel driving chain will be greater than that on the right wheel driving chain because of the natural tendency of the left wheel to resist turning as fast as the right wheel as the tractor makes a left-hand turn. Because the tension in the left-hand chain will be greater than the right, the chain force tending to restore the axle 77 to the neutral plane 136 will be greater than that for the right output shaft 92. Consequently, the power transmission to the left-hand drum can be less than that to the right-hand drum, the output speed of the left drum will be less than that of the right, and a natural differential action will be obtained.

Another advantage to be noted is the fact that, although the present invention provides this differential action, the amount of slip can be controlled and limited by the force applied to the control lever arm 108.

It is believed that from the foregoing description it will be apparent that the unusual mechanism of the present invention provides a very excellent drive unit particularly for vehicles such as garden tractors, golf carts, for example, and that it is especially well adapted and able to achieve the objects set out herein as well as providing advantages and features which may not have been specifically mentioned herein.

In the event that power transmission from the output shafts to the axles is to be by gear drive using gears with external teeth, rather than by chain and sprocket on external and internal gears, the axle axis would be located between the torsion bar axis and the output shaft axis, to obtain the differential action.

As suggested previously herein, there may be vehicular or non-vehicular applications of the present invention where it is desirable to drive one output shaft in one direction and the other output shaft in the opposite direction. To do this, both cradles must be rocked up or down at the same time, the direction depending on which output shaft is to go forward.

For accomplishing this, the modification shown in FIG. 10 represents one means. Instead of a straight lever 104 pivoting on bolt 40, a lever 141 is substituted, it having downturned legs 141a and 141b with slots therein receiving pins 103 and 102 respectively. A vertically movable pivot for lever 141 is provided on pin 142 mounted in an upstanding yoke at the inner end of shift lever 143. Lever 143 is pivotally mounted on pin 144 fixed to the base frame to move pin 142 up or down, as desired. If desired, means can be employed to lock lever 143 in neutral. One way to do this would be by a lock pin 146 through the base frame mount 147 and through the lever 143. Many alternate means for doing this and for moving the cradle frames may also be devised.

From the foregoing, it is apparent that variations may be made within the scope of the present invention and which would not have the same construction as that shown and described herein. Therefore, while the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A drive unit comprising:
    a base frame mounted to a vehicle frame and having first and second elongated side members with a front cross member extending across the front ends of said side members, a lower rear cross member, first and second upstanding side posts extending upwardly from said rear cross member and each of said upstanding side posts being connected to the rear end of one of said side members, an upstanding center post extending upwardly from said rear cross member equidistantly from said upstanding side posts, first and second intermediate side members extending forwardly from said rear cross member and upwardly at points behind said front cross member and then forwardly and joining said front cross member, an upper rear cross member extending across the upper ends of said upstanding posts at the rear of said base frame, and upper and lower bearing support members extending forwardly from said upper and lower rear cross members, respectively, and supported at their forward ends by said front cross member;
    a motor connected to said base frame;
    a power input shaft mounted for rotation in said upper and lower bearing support members and rotating on a vertical axis parallel to said upstanding posts and connected to said motor and driven thereby, said input shaft being supported to prevent axial motion thereof and movable only in rotation in said base frame;
    first and second drive members mounted on said input shaft, said first drive member being mounted above said upper bearing support member and said second drive member being mounted below said lower bearing support member, each of said drive members having a drive transmitting friction surface thereon which is a circular surface symmetrical with respect to said input shaft axis and generally sloping toward an apex on said input shaft axis, the apex of each of said friction surfaces being outside of the space between said drive members;
    a first generally rectangular cradle frame disposed at one side of said input shaft and a second generally rectangular cradle frame disposed at the opposite side of said input shaft, each of said cradle frames having outer and inner elongated side members and a pair of elongated cross members with the side members thereof extending parallel to the side members of the base frame, the first cradle frame having inboard and outboard support bearings for a first output shaft, said bearings having colinear axes perpendicular to the input shaft axis and parallel to said rear cross members, and said second cradle frame having inboard and outboard bearings for supporting a second output shaft with the axes of said bearings being colinear and perpendicular to the input shaft axis and parallel to said cross members;
    a first torsion bar having an outer end snugly received in and pinned to said base frame at said first side member and having an inner end journaled in the center upstanding post of said base frame, the portion adjacent the inner end of said first torsion bar having a snug fit in an aperture in the inner side member of said first cradle frame and being pinned thereto, there being a large aperture in the outer side member of said first cradle frame receiving the said first torsion bar therethrough with ample clearance to allow flexing of said torsion bar;
    a second torsion bar having a colinear axis with said first torsion bar and having an outer end snugly received in said base frame at said second side member and pinned to said base frame and having an inner end journaled in the center upstanding post of said base frame, the portion adjacent the inner end of said second torsion bar having a snug fit in an aperture in the inner side member of said second cradle frame and pinned thereto, the outer side member of said second cradle frame having a large aperture therein through which said second torsion bar extends with ample clearance to allow flexing of said second torsion bar, said torsion bars being formed to develop torsional restoration forces when twisted on their axes and being formed and mounted to accommodate bending in a vertical plane more readily than bending in a horizontal plane in said base frame;
    a first drive sprocket mounted to said first output shaft;
    a first driven sprocket mounted to a first axle shaft mounted for rotation in said first side member and said first intermediate side member of said base frame, with a first chain driving said first driven sprocket from said first drive sprocket;
    a second drive sprocket mounted to said second output shaft;
    a second driven sprocket mounted to a second axle shaft mounted for rotation in the second intermediate side member and second side member of said base frame, and a second chain connecting said second drive sprocket to said second driven sprocket, the axes of said torsion bars, said output shafts, and said axles normally lying in a common plane with the output shaft axes lying between the axles axes and torsion bar axes;

vehicle supporting road wheels secured to said axles;

a first driven member secured to said first output shaft and having an inner drive transmitting surface facing the friction surfaces of said drive members;

a second driven member secured to said second output shaft and having an inner drive transmitting surface facing the friction surfaces of said first and second drive members, the inner surfaces of said first and second driven members being circular surfaces symmetrical with respect to their respective output shaft axis and generally sloping toward apexes outside of space between said first and second driven members, the drive transmitting surfaces of said driven members being normally closely spaced to the drive transmitting surfaces of said drive members to normally avoid power transmission from said drive members to said driven members;

first and second forwardly projecting pins, said first pin projecting forwardly from the forward end of the outer side member of said first cradle member and said second pin projecting forwardly from the forward end of said outer side member of said second cradle member;

a clutch control lever pivotally mounted to said base frame on an axis perpendicular to the axes of said torsion bars and to said input shaft axis, said clutch control lever having a first aperture therein receiving said first forwardly projecting pin and a second aperture therein receiving said second forwardly projecting pin, and said clutch control lever being operable when tilted in a plane parallel to said input shaft axis and said torsion bar axes to pivot one of said cradle frames downwardly with respect to said common plane and the other of said cradle frames upwardly with respect to said common plane for engagement of the drive transmitting surface of one of said driven members with the drive transmitting surface of said first drive member and for engaging the drive transmitting surface of said other driven member with the drive transmitting surface of said second drive member to effect power transmission from said input shaft to both of said first and second axles in the same direction;

said drive transmitting surfaces of said first and second drive members having apex angles slightly greater than apex angles of said drive transmitting surfaces of said first and second driven members to establish a theoretical point contact therebetween upon engagement thereof, the bending of said torsion bars in said vertical plane accommodating the tilting of said first and second output shafts with respect to said common plane to accommodate movement of the points of contact along said driving surfaces toward and away from said common plane to change the ratios of output shaft speeds to input shaft speeds;

and means pivotally mounted to said base frame for selectively raising and lowering the pivotal axis of said clutching control lever to accommodate simultaneous pivoting of both of said cradle frames on said torsion bar axis in the same direction to produce simultaneous rotation of one of said output shafts in one direction and of the other of said output shafts in the other direction, when desired.

2. A drive unit comprising:

a base frame having first and second side members with a first cross member extending across said side members, a second cross member connected to said side members, a center post extending from said second cross member, a bearing support member extending from said second cross member and supported by said first cross member;

a motor connected to said base frame;

a power input shaft mounted for rotation in said bearing support member and connected to said motor and driven thereby, said input shaft being supported to limit axial motion thereof in said base frame;

first and second drive members mounted on said input shaft, each of said drive members having a drive transmitting surface thereon which is a circular surface symmetrical with respect to said input shaft axis and generally tapering toward a point on the input shaft axis, the point for each of said surfaces being outside of the space between said drive members;

a first cradle frame disposed at one side of said input shaft and a second cradle frame disposed at the opposite side of said input shaft, each of said cradle frames having outer and inner side members and a cross member, the first cradle frame having support bearings for a first output shaft, said bearings having an axis perpendicular to the input shaft axis, and said second cradle frame having bearings for supporting a second output shaft with the axes of said bearings being perpendicular to the input shaft axis;

a first torsion bar having an outer end fixed to said base frame at said first side member and having an inner end journaled in the center post of said base frame, the portion adjacent the inner end of said first torsion bar being fixed to the inner side member of said first cradle frame;

a second torsion bar having a colinear axis with said first torsion bar and having an outer end fixed to said base frame at said second side member and having an inner end journaled in the center post of said base frame, the portion adjacent the inner end of said torsion bar being fixed to the inner side member of said second cradle frame, said torsion bars being formed to develop torsional restoration forces when twisted on their axes and being formed and mounted to accommodate bending in a plane parallel to said input shaft more readily than bending in a plane perpendicular to said input shaft;

a first axle supported for rotation in said base frame;

first positive drive transmitting means connecting said first axle to said first output shaft;

a second axle shaft mounted for rotation in said base frame;

second positive drive transmitting means connecting said second axle to said second output shaft, the axes of said torsion bars, said output shafts, and said axles normally lying in a common plane;

a first driven member secured to said first output shaft and having an inner drive transmitting surface facing the drive transmitting surfaces of said drive members;

a second driven member secured to said second output shaft and having an inner drive transmitting surface facing the drive transmitting surfaces of said first and second drive members, the inner surfaces of said first and second driven members being circular surfaces symmetrical with respect to their respective output shaft axes and generally tapering toward points outside of the space between said first and second driven members, the drive transmitting surfaces of said driven members being normally closely spaced to the drive transmitting surfaces of said drive members to normally avoid power transmission from said drive members to said driven members;

a clutch control lever pivotally mounted to said base frame, said lever being connected to said cradle frames and operable when pivoted on its axis to pivot one of said cradle frames in one direction with respect to said common plane and the other of said cradle frames in the opposite direction with respect to said common plane for engagement of the drive transmitting surface of one of said driven members with the drive transmitting surface of said first drive member and for engaging the drive transmitting surface of said other driven member with drive transmitting surface of said second drive member to effect power transmission from said input shaft to both of said first and second axles in the same direction;

said drive transmitting surfaces of said first and second drive members having apex angles slightly greater than apex angles of said drive transmitting surfaces of said first and second driven members to establish a theoretical point contact therebetween upon engagement thereof, the bending of said torsion bars in said parallel plane accommodating the tilting of said first and second output shafts with respect to said common plane to accommodate movement of the points of contact along said driving surfaces toward and away from said common plane to change the ratios of output shaft speeds to input shaft speeds;

and means pivotally mounted to said base frame for selectively moving the pivotal axis of said clutch control lever to accommodate simultaneous pivoting of both of said cradle frames on said torsion bar axis in the same direction to produce simultaneous rotation of one of said output shafts in one direction and of the other of said output shafts in the other direction, when desired, the positions of the output shaft axes and axles being located with respect to said torsion bar axis such that forces developed in each of said drive transmitting means during power transmission from said input shaft to said output shafts tend to return the output shafts to which each drive transmitting means is connected, to said common plane with a force proportional to the torque on the axle to which the drive transmitting means is connected.

3. A drive unit comprising:

a power input shaft mounted for rotation in said base frame, said input shaft being supported to limit axial motion thereof in said base frame;

first and second drive members mounted on said input shaft, said drive members having drive transmitting surface thereon tapering toward a point on the input shaft axis, the point for each of said surfaces being outside of the space between said drive members;

a first support frame disposed at one side of said input shaft and a second support frame disposed at the opposite side of said input shaft, the first support frame supporting a first output shaft, and said second support frame supporting a second output shaft;

a first connecter means movably connecting said first support frame to said base frame;

a second connector means movably connecting said second support frame to said base frame;

a first axle supported for rotation in said base frame;

first positive drive transmitting means connecting said axle to said first output shaft;

a second axle mounted for rotation in said base frame;

second positive drive transmitting means connecting said second axle to said second output shaft;

a first driven member secured to said first output shaft and having an inner drive transmitting surface facing the drive transmitting surfaces of said drive members;

a second driven member secured to said second output and having an inner drive transmitting surface facing the drive transmitting surfaces of said first and second drive members, the inner surfaces of said first and second driven members tapering toward points outside of the space between said first and second driven members, the drive transmitting surfaces of said driven members being normally held in neutral positions closely spaced to the drive transmitting surfaces of said drive members to normally avoid power transmission from said drive members to said driven members;

a clutch control member movably mounted to said base frame, said clutch lever being connected to said support frames and operable when moved on said base frame to move said first and second support frames in opposite directions for engagement of the drive transmitting surface of one of said driven members with the drive transmitting surface of said first drive member and for engaging the drive transmitting surface of said other driven member with the drive transmitting surface of said second drive member to effect power transmission from said input shaft to both of said first and second axles in the same direction;

the said drive transmitting surfaces of said first and second drive members having apex angles slightly greater than apex angles of said drive transmitting surfaces of said first and second driven members to establish a theoretical minimal area of contact therebetween upon engagement thereof, said connecting means being resiliently deflectable to permit movement of the contact areas along said drive transmitting surfaces toward and away from the input shaft axis to change the ratios of output shaft speeds to input shaft speeds.

4. A drive unit comprising:

a base frame;

a first shaft mounted for rotation in said base frame, said first shaft being supported to limit axial motion thereof in said base frame;

first and second drive members mounted on said first shaft, and having respectively first and second drive transmitting surfaces thereon, each of said drive transmitting surfaces being generally convergent toward a point on the first shaft axis, the point for each of said surfaces being outside of the space between said drive members;

a first support frame supporting a second shaft;

first connector means movably connecting said first support frame to said base frame;

a third drive member secured to said second shaft and having an inner drive transmitting surface facing the drive transmitting surfaces of said first and second drive members, the drive transmitting surface of said third drive member being normally held in neutral position closely spaced to the drive transmitting surfaces of said second and first drive members to avoid power transmission between said first shaft and said second shaft;

said drive transmitting surfaces being circular and centered on their respective shaft axes; and said drive members being disposed with surface portions of a certain radius on said first and second surfaces closely spaced to a surface portion of a particular radius on said inner surface, and with surface portions on said first and second surfaces of greater radius than said certain radius being closely spaced to surface portions on said inner surface of lesser radius than said particular radius;

and a clutch control member movably mounted to said base frame, and connected to said support frame and movable on said base frame in one direction initially to cause engagement of the drive transmitting surface of one of said drive members with the theretofore closely spaced drive transmitting surface of said third drive member at a theoretical point of contact therebetween to effect power transmission between said first and second shafts at a first speed ratio therebetween, said control member being movable further in said one direction to move the said theoretical point of contact generally axially along the drive transmitting surfaces of said one drive member and said third drive member to a point closer to the axis of said second shaft and farther from the axis of said first shaft to change the speed ratio between said first and second shafts.

5. A drive unit comprising:
   a first frame having means for attachment thereof to a vehicle;
   a powered shaft mounted for rotation on said frame on a first axis and having first and second driver members thereon, said driver members having generally tapering friction surfaces thereon;
   a second frame;
   a first driven member mounted for rotation on a second axis, said second axis having a fixed location with respect to said second frame, said first driven member having an internal tapering surface in closely spaced facing relationship to portions of the said friction surfaces of said driver members;
   a bar having one end affixed to said first frame and having the other end affixed to said second frame, said bar normally supporting said second frame with said second axis perpendicular to said first axis and accommodating movement of said second axis both in rotation and translation while generating a resilient restoring force to return said second axis to condition perpendicular to said first axis, the translation and rotation of said second axis coinciding with engagement of said internal surface with one of said driver members to transmit power from said one driver member to said driven member.

6. A drive unit comprising:
   a first frame;
   a first shaft mounted for rotation on said first frame on a first axis, and having first and second drive transmitting members thereon, each of said drive transmitting members having a drive transmitting surface thereon formed by the revolution about said axis of a line beginning at a first point at a first distance from said axis and extending in a generally axial direction to a second point at a second distance from said axis greater than the first distance, the drive transmitting surface of each of said drive transmitting members thereby having a major diameter and a minor diameter, with the major diameter of each being closer to the major diameter of the other than the minor diameter of each is to the minor diameter of the other;
   a third drive transmitting member having a second axis and a drive transmitting surface formed by the revolution about said second axis of a second line beginning at a third point and extending in a generally axial direction to a fourth point farther from said second axis than said third point, said fourth point being closer to said first axis than said third point, whereby the drive transmitting surface of said third drive transmitting member faces the drive transmitting surfaces of said first and second drive transmitting members;
   a second frame supporting said third drive transmitting member for rotation thereon on said second axis, said second frame being movably mounted to said first frame and normally positioned to hold the drive transmitting surface of said third member in equally spaced relationship to the drive transmitting surfaces of said first and second members to avoid drive transmission therebetween, said second frame being movable on said first frame in a first direction to engage the drive transmitting surfaces of said first and third members for power transmission therebetween, and said second frame being movable on said first frame in a second direction opposite said first direction to disengage the drive transmitting surfaces of said first and third members and engage the drive transmitting surfaces of said second and third members.

7. The drive unit set forth in claim 6 wherein said line for one of said members is curved and forms a convex surface of revolution on said one member.

8. The drive unit set forth in claim 6 wherein said line for one of said members is straight and forms a conical surface of revolution on said one member.

9. The drive unit set forth in claim 6 wherein the mounting of said second frame to said first frame and the shapes of said drive transmitting surfaces are such as to provide only a theoretical point contact engagement between said drive transmitting surfaces.

10. The drive unit set forth in claim 9 wherein said second frame is mounted to said first frame by a torsion bar, and movement of said second frame in said first direction is in a plane perpendicular to the axis of said torsion bar to establish a torsional restoring force therein, and external force applying means are connected to said first frame at a point cooperating with one of said first and second members for establishing a bending moment on said torsion bar thereby bending said torsion bar and allowing movement of said theoretical contact point along said engaging surfaces away from said first axis and toward said second axis to change the speed ratio between said one member and said third member.

11. A drive unit comprising:
   a base frame;
   a first shaft mounted for rotation in said base frame;
   a first drive member mounted on said first shaft and having an external drive transmitting surface thereon, said surface being generally convergent toward a point on the first shaft axis;
   a first support frame supporting a second shaft;
   a second drive member secured to said second shaft and having an inner drive transmitting surface thereon facing said external drive transmitting surface, the drive transmitting surfaces of said first and second drive members being normally held in closely spaced relationship to each other to avoid power transmission between said first shaft and said second shaft and thus provide a neutral condition while enabling transition to a power transmission condition;
   said drive transmitting surfaces being circular and centered on their respective shaft axes;
   and said drive members being disposed with a surface portion of a certain radius on said external surface closely spaced to a surface portion of a particular radius on said inner surface, and with a surface portion on said external surface of greater radius than said certain radius being closely spaced to a surface portion on said inner surface of lesser radius than said particular radius;
   and clutch means movable to initially engage portions of said drive transmitting surfaces providing power transmission between said drive members at a first speed ratio, said clutch means being movable further to effect power transmission between said drive members at a speed ratio different from said first speed ratio.

12. The drive unit of claim 11 wherein one of said drive transmitting surfaces is convex.

13. A drive unit comprising:
   a first frame having means for attachment thereof to a vehicle;
   a powered shaft mounted for rotation on said frame on a first axis and having a driver member thereon, said driver member having a generally convergent drive transmitting surface thereon;
   a second frame;
   a driven member mounted for rotation on a second axis, said second axis having a fixed location with respect to said second frame, said driven member having an internal convergent drive transmitting surface in closely spaced facing relationship to a portion of the said drive transmitting surface of said driver member;
   means normally supporting said second frame on said first frame with said second axis perpendicular to said first axis, said second frame being movable on said first frame to effect movement of said second axis both in rotation and translation out of perpendicular relationship to said first axis for engagement of said drive transmitting surface of said driven member with that of said driver member, said mounting means including resilient means located on said first and second frame to resist the said movement of said second frame and thereupon generate a resilient restoring force to return said second axis to its condition perpendicular to said first axis, the translation and rotation of said second axis coinciding with engagement of said internal surface with said drive transmitting surfaces of said driver member to transmit power from said driver member to said driven member.

14. The drive unit of claim 13 wherein one of said drive transmitting surfaces is convex.

References Cited by the Examiner
UNITED STATES PATENTS

| | | | |
|---|---|---|---|
| 1,197,535 | 9/1916 | O'Donnell | 74—191 |
| 1,241,609 | 10/1917 | Davis | 74—721 X |
| 1,633,316 | 6/1927 | Davis | 74—191 |
| 1,852,360 | 4/1932 | Mitchell | 74—721 |

DAVID J. WILLIAMOWSKY, *Primary Examiner.*

J. R. BENEFIEL, *Assistant Examiner.*